(12) United States Patent
Provino et al.

(10) Patent No.: US 6,601,081 B1
(45) Date of Patent: Jul. 29, 2003

(54) METHOD AND APPARATUS FOR CONTEXT MAINTENANCE IN WINDOWS

(75) Inventors: Joseph E. Provino, Cambridge, MA (US); Mark M. Towfigh, W. Medford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1301 days.

(21) Appl. No.: 08/497,287

(22) Filed: Jun. 30, 1995

(51) Int. Cl.[7] .............................................. G06F 17/00
(52) U.S. Cl. ......................................... 709/1; 709/108
(58) Field of Search ............................... 395/650, 678, 395/670; 709/1, 100, 108

(56) References Cited

U.S. PATENT DOCUMENTS

| | | | | | |
|---|---|---|---|---|---|
| 4,912,628 A | * | 3/1990 | Briggs et al. | ................ | 395/670 |
| 5,057,997 A | * | 10/1991 | Chang et al. | ................ | 364/200 |
| 5,220,669 A | * | 6/1993 | Baum et al. | ................ | 395/775 |
| 5,349,680 A | * | 9/1994 | Fukuoka | ....................... | 395/678 |
| 5,414,848 A | * | 5/1995 | Sandage et al. | ............ | 395/677 |
| 5,428,779 A | * | 6/1995 | Allegrucci et al. | ......... | 395/678 |
| 5,452,462 A | * | 9/1995 | Matsuura et al. | ........... | 395/650 |
| 5,555,385 A | * | 9/1996 | Osisek | ........................ | 395/680 |

OTHER PUBLICATIONS

Zytaruk, Kelly, 'Windows 3.1 Virtual Machine Control Block, Part 1', Dr. Dobb's, Jan. 1994 v19, n1, pp 115(8).*
Zytaruk, Kelly, Windows 3.1 Virtual Machine Control Block, Part 2;, Dr. Dobb's, Feb. 1994, v19, n2, pp 107 (7).*
Muller, Klaus, 'Think globally, act locally', Dr. Dobb's, Apr. 1994 v19, n4 p125 (7).*
Blake et al, 'Exploring a Stack Architecture', *Tutourial on Advanced Microprocessor & High–Level Language Computer Architecture*, IEEE Computer Society pp. 315–324 May 1977.*
Bulman et al. 'Stack Computers: An Intro.', Tutorial on Advanced Microprocessor & High devil Language Computer Architecture, IEEE Computer Society pp 305–314.*

* cited by examiner

*Primary Examiner*—Sue Lao
*Assistant Examiner*—Peter Stecher

(57) ABSTRACT

A computer system includes a global machine for providing a virtual machine for a plurality of applications programs, including a calling applications program and a called applications program which is called by said calling applications program, and further provides a global state store for storing selected global state information for controlling selected operations. The calling program conditions the global state information stored in the global state store to a calling program global state, performs predetermined calling program processing operations and calls the called applications program. The called program, upon being called by the calling program, saves the calling program global information contained in the global state store. The calling program further conditions the global state information in the global state store to a called program global state, performs predetermined called program processing operations, and thereafter restores the saved calling program global state to the global state information store and returns control to the calling program, thereby to ensure that, when the calling program is again processed, the global state information will be proper for the calling program.

30 Claims, 4 Drawing Sheets

METHOD AND APPARATUS FOR CONTEXT MAINTENANCE IN WINDOWS

FIELD OF THE INVENTION

The invention relates generally to the field of digital data processing systems and more specifically to systems and methods for facilitating maintenance of global information which control certain computer operations in a computer system. In particular, the invention provides an arrangement for use in connection with applications programs operating under, for example, the Microsoft Windows™ operating system, which provides an environment in which a number of applications programs may be contemporaneously executed, for facilitating the maintenance of global information for each applications program.

BACKGROUND OF THE INVENTION

In performing processing operations, computer systems make use of applications programs to perform such operations as database management, word processing, accounting, process control and numerous other functions in an office or industrial environment. The applications programs generally make use of operating system programs both to provide an environment in which they can be conveniently executed and to provide system services such as low-level control of various hardware elements. One popular operating system program, namely, Microsoft Windows™ ("Windows") operates in conjunction with Microsoft's MS-DOS operating system program to provide an environment in which applications programs written for Windows can be executed. The Windows operating system program provides, among other things, a graphical user interface ("GUI") as well as a multi-tasking operating environment in which a plurality of Windows programs can be executing contemporaneously. Windows also provides an environment in which other applications programs written for MS-DOS can be executed. Since MS-DOS applications programs are typically designed on the assumption that only services provided by MS-DOS will be provided, such as low-level control of the computer system hardware, but not those services provided by Windows, MS-DOS programs will not take advantage of the additional services, such as the GUI and multi-tasking, provided by Windows.

In facilitating multi-tasking operation, Windows provides a so-called "virtual machine" environment for the applications programs which is concurrently executing. The virtual machine environment can help protect against incorrect operation by one applications program, operating in one virtual machine, corrupting another applications program's programs and data. In addition, Windows provides a "global" environment which controls the selection of the virtual machines to be run, provides operating system services thereto, and provides global registers that control certain operational characteristics by the hardware. The applications programs operating in the respective virtual machines, as well as the operating system program, can control the states of certain of the global registers to, in turn, control the hardware. Several virtual machines may be enabled contemporaneously and run in an interleaved manner, and so it is important to ensure that the global registers contain the correct state for each virtual machine when it is being executed.

SUMMARY OF THE INVENTION

The invention provides a new and improved system and method for facilitating maintenance of global information which control certain computer operations in a multi-tasked computer system.

In brief summary, in one aspect the invention provides a computer system including a global machine for providing a virtual machine for a plurality of applications programs, including a calling applications program and a called applications program which is called by said calling applications program, and further provides a global state store for storing selected global state information for controlling selected operations. The calling program conditions the global state information stored in the global state store to a calling program global state, performs predetermined calling program processing operations and calls the called applications program. The called program, upon being called by the calling program, saves the calling program global information contained in the global state store. The calling program further conditions the global state information in the global state store to a called program global state, performs predetermined called program processing operations, and thereafter restores the saved calling program global state to the global state information store and returns control to the calling program, thereby to ensure that, when the calling program is again processed, the global state information will be proper for the calling program.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
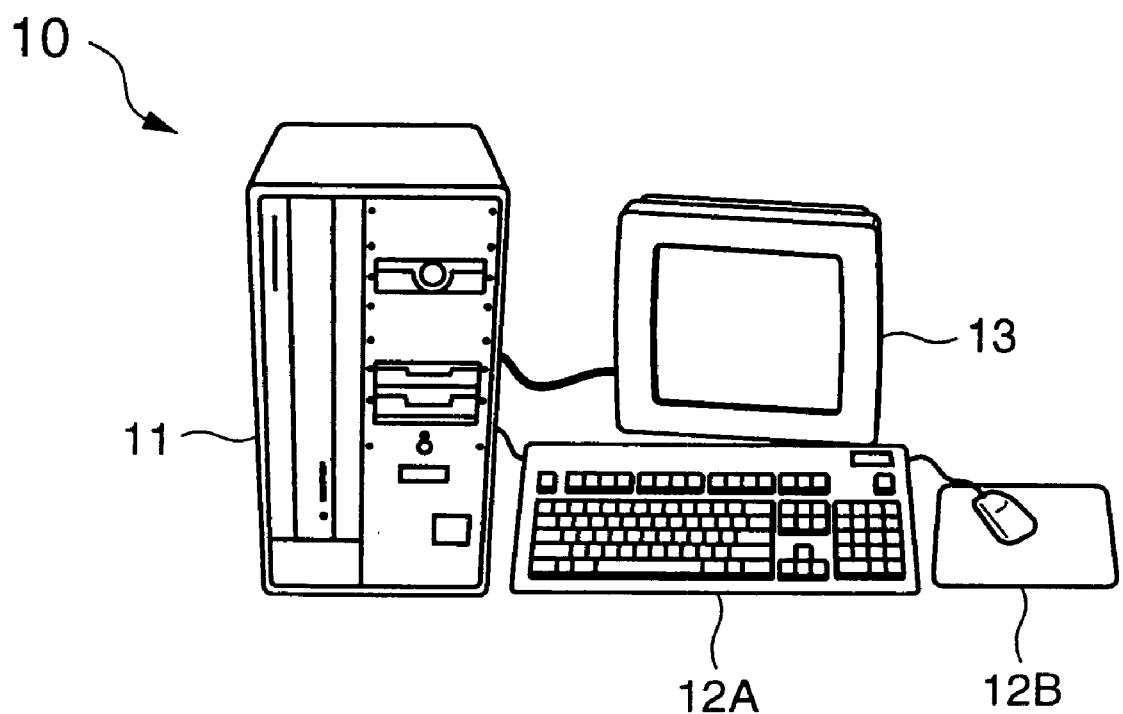
FIG. 1 depicts an illustrative computer system incorporating a context maintenance arrangement in accordance with the invention.

FIG. 1 depicts an illustrative computer system 10 constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

The invention provides an arrangement for performing context maintenance in the operating environment provided by Microsoft Windows™ operating system program ("Windows"), in particular facilitating the saving and return of certain context information, including global context information, during a context switch operation. By way of background, Windows provides an operating environment in which a number of applications programs can be executed contemporaneously in a cooperative, non-preemptive manner, so-called "cooperative multi-tasking." FIG. 2 depicts, in functional block diagram form, structures maintained and used by Windows, in cooperation with various applications programs, in facilitating cooperative multi-tasking.

Figure 2:
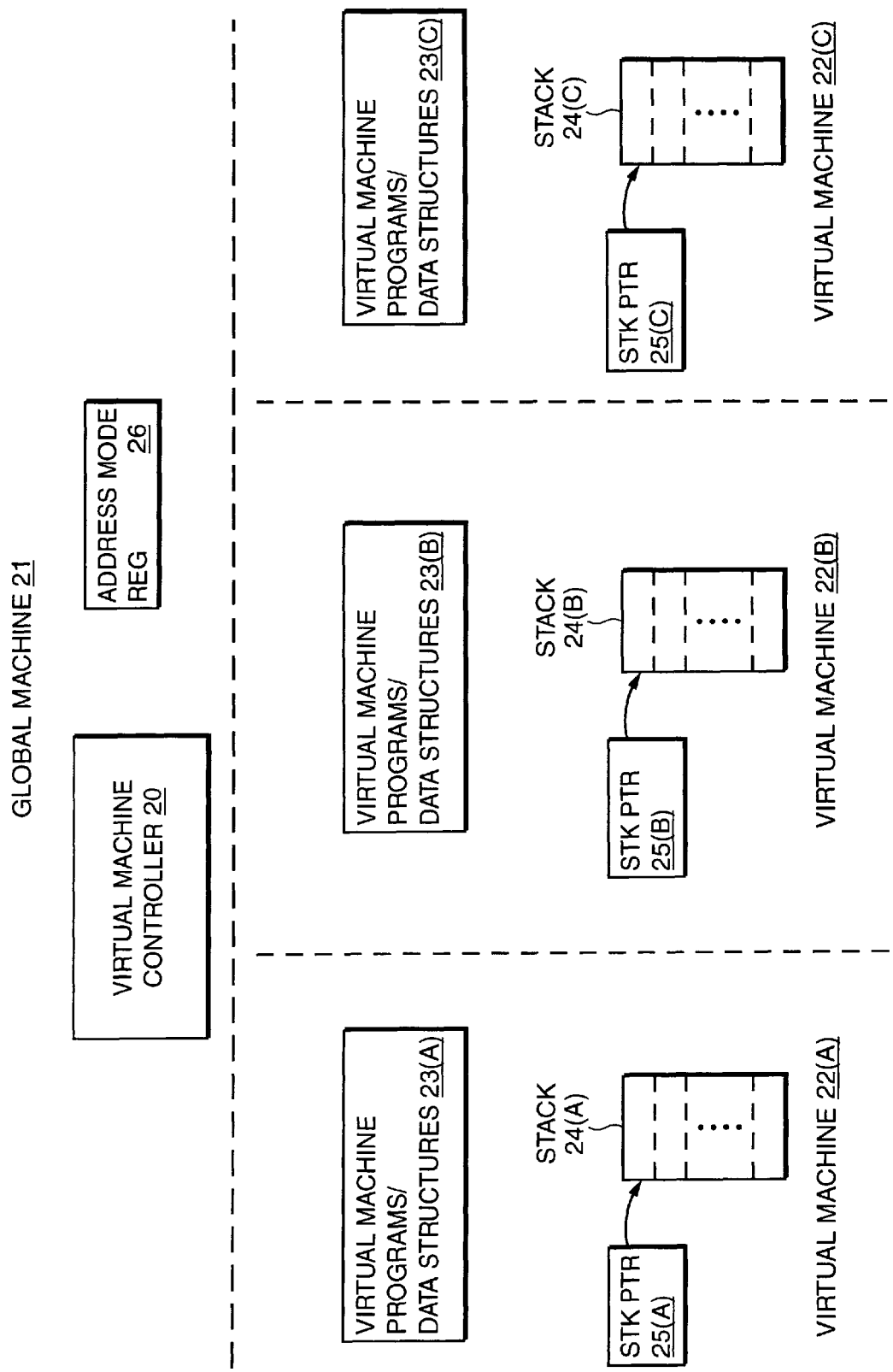
FIG. 2 schematically represents a functional block diagram of various global and virtual machine structures useful in understanding the invention.

With reference to FIG. 2, Windows provides a virtual machine controller 20, operating in a global machine 21, which provides programs and data structures for establishing and controlling one or more virtual machine environments 22(A) through 22(V) (generally identified by reference numeral 22($v$)). The virtal machine controller 20 generally provides a virtual machine environment 22($v$) for various contemporaneously-executing applications programs or group of related programs which together comprise an applications program. As shown in FIG. 2, each virtual machine environment 22($v$) will be associated with the respective program's code as well as data structures and other data which are used by the program, all of which are generally represented by reference numeral 23($v$). Each program running in a virtual machine 22($v$) may also store information in, and/or retrieve information from, at least some of the registers and other data structures in the global machine 21 for controlling various elements of the computer system 10 while it is being processed.

With specific respect to the present invention, each virtual machine environment will also be provided with a stack 24($v$) and an associated stack pointer 25($v$). As is conventional, a stack 24($v$) includes a plurality of stack entries 24($v$)(1) through 24($v$)(T$_v$) (generally identified by reference numeral 24($v$)($t$)), where the value of index "TV," which corresponds to the number of stack entries 24($v$)($t$) in the respective stack 24($v$), may vary as among the various virtual machines 22($v$). A program operating in a virtual machine 22($v$) may use its stack 24($v$) to store information in a last-in first out manner, with the stack pointer 25($v$) pointing to the top location 24($v$)(T$_v$) in the stack. When a program operating in a virtual machine 22($v$) stores, or "pushes," information in its stack 24($v$), it increments the stack pointer 25($v$) to add a new top stack entry 24($v$)(T$_v$') (where T$_v$'=T$_v$+1) to the stack and loads the information in the new top stack entry 24($v$)(T$_v$'). On the other hand, when a program retrieves, or "pops," information from its stack, it transfers the information from the stack entry 24($v$)(T) pointed to by the stack pointer 25($v$) for processing by the program, and decrements the stack pointer 25($v$) to point to the new top stack entry 24($v$)(T$_v$") (where T$_v$"=T$_v$−1).

The virtual machine controller 20 will, among other things, enable programs in the respective virtual machines to be processed in an interleaved fashion in successive time slots. The successive time slots allocated for the respective virtual machines may all be of the same duration, or the durations may differ for the various virtual machines based on a predetermined priority system. The virtual machines may be run in any order in the successive time slots. In addition, the number of times a specific virtual machine is selected to be run over a particular period, in relation to the number of times other virtual machine's are selected, may also be based on a predetermined priority system, so that victual machines with high priority may be run more often than virtual machines with low priority and effectively giving the high priority time slots more processing time.

When a virtual machine is running, in its time slot, it may under certain conditions determine that it is to relinquish, its time slot prior to the end of the time slot. When that occurs, the virtual machine will notify the virtual machine controller 20, which will then select and enable another virtual machine to run, without waiting for the relinquishing virtual machine's time slot to end. A virtual machine may relinquish its time slot if, for example, its associated program is an input/output driver which has initiated an input/output request, such as a storage or retrieval operation in connection with the mass storage subsystem or a message transmission over a network, and is waiting for an indication that the request has been completed. Since some relatively significant amount of time may elapse before the completion indication is returned, the virtual machine will relinquish control to allow the virtual machine controller 20 to select another virtual machine to be run.

With the diverse virtual machines, the different programs will make use of their private information, including data and data structures, and will also make use of global information which is available to all of the virtual machines. One type of such global information is address mode information, which is stored in an address mode register 26 in the global machine 21. In particular, Windows allows programs to utilize instructions in which, for each program instruction to be processed, the addressing information identifying memory locations containing the data to be processed is encoded in one of a number of addressing modes. For each program (more specifically, for each virtual machine) addressing information is encoded in one of the various types of addressing modes. The addressing mode specified for the respective virtual machine will determine how addresses in instructions executed in that virtual machine are decoded and used to address data and data structures in the computer's memory to be processed by the program. If, for example, a virtual machine is associated with a "sixteen bit" addressing mode, Windows will determine that each address is encoded as an offset from a base address which may be located in, for example, a processor register or storage location in memory. For such a virtual machine, the processor of the computer system 10 will be enabled to generate the address by adding the offset value from the instruction to the contents of the register or other location which contains the base address, and using the sum as the memory address. On the other hand, if a program encodes addressing information in a "thirty-two bit" addressing mode, Windows will determine that the address is an absolute address (that is, the address is effectively not encoded) and the processor will be enabled use the address from the instruction directly as the memory address. Other addressing modes may also be used, and the address mode that is used at any particular point in time is indicated by the contents of an address mode register 26.

The invention provides a system and computer-implemented method for ensuring, for global information, such as the address mode value, maintained by the global machine 21 but which may vary as among the various virtual machines 22(v), when the virtual machine controller 20 enables a particular virtual machine 22(v) to run, that the global information associated with the particular virtual machine will be in the appropriate global storage locations, such as the address mode register 26 in the case of the address mode value. The invention will be described in the context of a driver program, which may be called by an applications program to perform an input/output operation such as to transmit a message, including message data generated by the applications program, to another computer system (not shown) over a network (also not shown). The applications program and the driver program will be run in the same virtual machine 22(v), but the driver program may be used by applications programs in any of the virtual machines. The driver program will be processed in the calling applications program's time slots to generate and enable the computer system's hardware to transmit the message. At some point, after the driver program has generated the message and queued it for transmission, it will be in condition to wait for acknowledgment that the message has been transmitted. At that point, since the driver program will be waiting for operation by another element of the computer system 10, it will relinquish time remaining on its current time slot until the other element has completed its operations, at which point it (the driver program) can resume operations. It will be appreciated that, until that occurs, the driver program will not be in condition to run. After the hardware has completed its operations, the driver program can again be run and return control to the applications program.

Figure 3A:
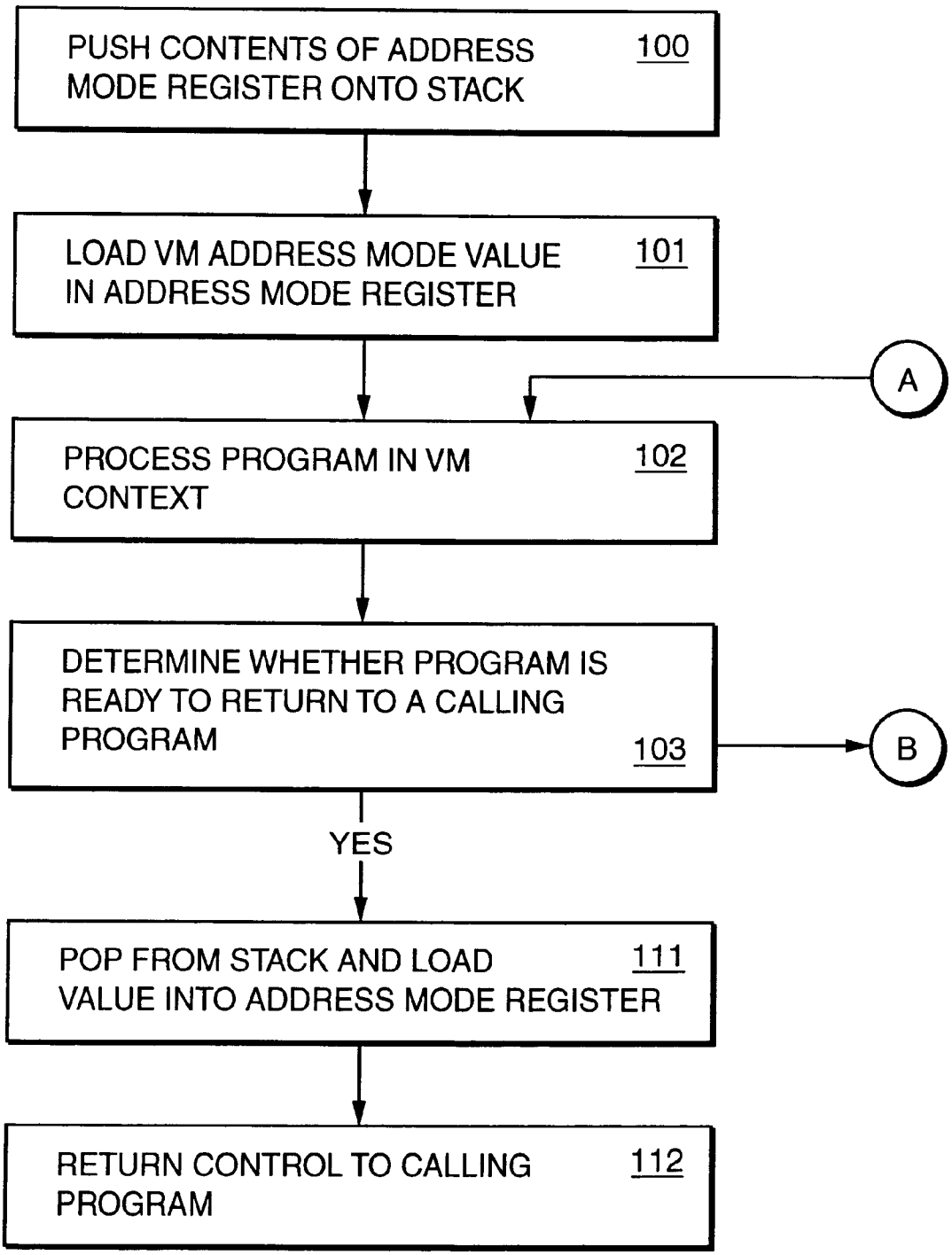
FIGS. 3A and 3B together constitute a flow chart depicting the operations performed by the computer system in connection with the invention.
Figure 3B:
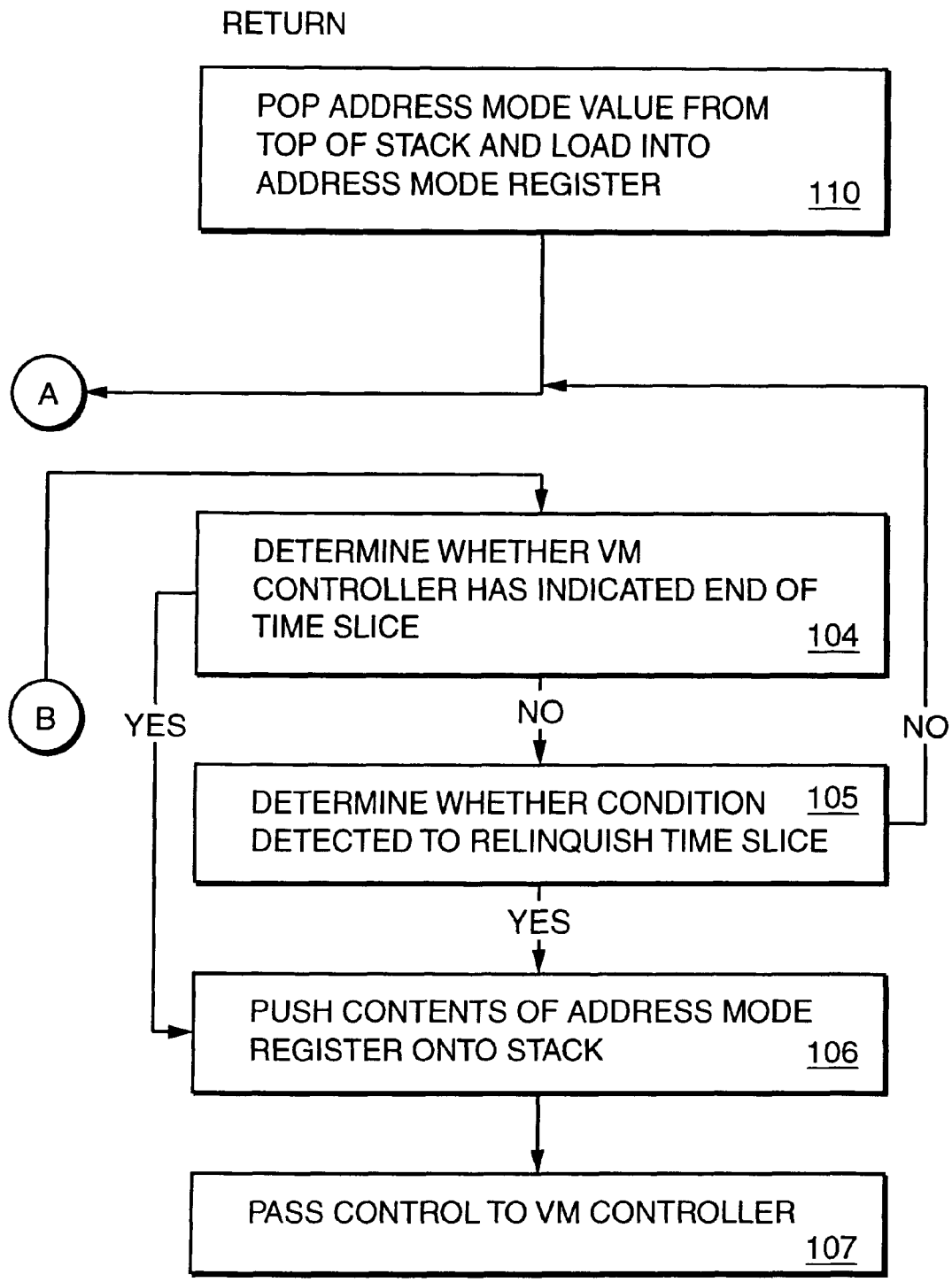

As noted above, the invention provides an arrangement for insuring that the global information associated with the applications program's virtual machine will be in the appropriate storage location(s) in the global machine 21 when the driver program's virtual machine returns control to it, and for also ensuring that the global information associated with driver program's virtual machine will be in the appropriate storage locations in the global machine 21 in the events that (i) the virtual machine controller 20 indicates that the driver program's time slot has terminated, and (ii) the driver program stalls before the end of its time slot and relinquishes the remaining time in its time slot. The operations performed by the driver program will be described in connection with FIGS. 3A and 3B. With reference initially to FIG. 3A, when the driver program is initially called by the applications program, the driver program will initially push the contents of the global registers to be saved (in particular, the address mode register 26 as described above) onto its virtual machine's stack 24($v_D$) (step 100). It will be appreciated that the global registers contain information associated with the calling applications program, in which case the driver program will save the calling applications program's global information on its own stack 24($v_D$). Thereafter, the driver program will load its own global information, including its address mode value, into the global registers in the global machine 21 (step 101) and will proceed to perform its various processing operations (step 102), such as initiating the input/output operations as described above.

While performing processing operations, the driver program will periodically sequence to a series of operations in which it determines (i) whether it has completed operations and is ready to return to the calling program (step 103), (ii) whether the virtual machine controller 20 has indicated that its time slot is ended (step 104, FIG. 3B), or (iii) whether its processing condition is such that it is to relinquish remaining time in its time slice (step 104). As noted above, the driver program may determine that its operations have completed (step 103) when, for example, it is notified by hardware that the operation initiated by the driver program have completed. In addition, the driver program may determine that it is in condition to relinquish remaining time in its time slice (step 105) when, for example, it has initiated operations by hardware and it is waiting for confirmation from the hardware that the operation has completed. If the driver program makes a negative determination in steps 103 through 105, it will return to step 102 to continue processing operations.

When the driver program determines in either step 104 that the virtual machine controller has indicated that its time slot has ended, or in step 105 that it is to relinquish remaining time in its time slot, it sequences to a step 106 to push the contents of global registers to be saved (in particular, the address mode register 26) onto the stack 24(v) of the virtual machine in which it has been running (step 106) and passes control to the virtual machine controller 20 (step 107). The virtual machine controller 20 thereafter will enable other programs to be executed in respective virtual machines 24(v) and respective time slices.

At some point thereafter, the virtual machine 20 will, at the beginning of a new time slice, make a determination as to whether the driver program's virtual machine 24(v) is to be run again. If control had passed to another virtual machine 24(v) as the result of a determination in step 104 that the time slice of the driver program's virtual machine 24(v) had ended, this may occur if the driver program's virtual machine 24(v) is again at the top of the order of priority in the virtual machine controller's task list, as described above. On the other hand, if control has passed to another virtual machine 24(v) as the result of a determination in step 105 that the driver program's virtual machine 24(v) was to relinquish its time slice because it needed to wait for another subsystem in the computer system 10 to complete the operation initiated by the driver program, this may occur when the other subsystem completes the operation and the driver program's virtual machine 24(v) again being at the top of the order of priority in the virtual machine controller's task list. In either case, the virtual machine controller 20 will return control to the driver program through step 110. In step 110, the driver program pops from its stack 24(v) the global information that it had previously stored in its stack in step 106 for storage in the global machine 21, in particular the driver programs address mode information which it stores in the address mode register 26. Thereafter, the driver program will sequence to step 102 to continue processing operations as described above. Since the global information that the driver program returns to the global machine 21 in step 110 corresponds to the global information that the driver program had previously pushed onto the stack in step 106, which in turn corresponds to the global information associated with the driver program's virtual machine 24($v_D$), following step 110 the global information maintained by the global machine 21 will again be the information that is associated with the driver program's virtual machine 24(v) and required for processing thereby.

Following the return to step 102, the driver program will continue processing in connection with steps 102 through 105. In connection therewith, the driver program will repeat the operations described above in connection with steps 106 and 107 if the driver program makes a positive determination in steps 103 and 104, and step 110 when the virtual machine controller 20 returns control to the driver program's virtual machine 24(v), until it (the driver program) determines in step 103 that it has finished processing and is ready to return control to the calling program. When that occurs, the driver program will pop the global information from its stack and load the popped information in the respective global registers of the global machine 21 (step 111); with the specific example of the address mode information as described above, the driver program will in step 111 pop the address mode value from the stack for storage in the address mode register 26. It will be appreciated that the information popped by the driver program from the stack in step 111 will correspond to the information that it pushed onto the stack in step 100, which, in turn, corresponds to the global information associated with the calling program's virtual machine 24(v) at the point in time at which the driver program was called. Thereafter, the driver program sequences to step 112 to return control to the calling program.

It will be appreciated that, in performing the operations described above in connection with FIGS. 3A and 3B, the driver program ensures that the global information for the calling program will be preserved in the calling program's virtual machine 24(v) when it (the driver program) is initially called (that is, when the driver program is entered through step 100), and further ensures that the global information for the driver program will be preserved when it is suspended following step 107. In both cases, the global information will be preserved on the calling program's virtual machine's stack 24(v). The driver program further ensures that its global information will be properly restored when it is resumed (when the driver program is entered through step 110) and that the global information associated with the calling program's will be properly restored when it (the driver program) returns control to the calling program. The use of the stack 24(v) of the virtual machine in which the applications program is executed provides an efficient mechanism for ensuring that the global information will be stored in the proper sequence so that the global information for the calling program and the driver program can be restored in the proper sequence.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer system including:
   A. a global machine for providing a respective virtual machine for each of a calling program and a called program, the global machine further providing a global state store for storing selected global state information for controlling selected operations;
   B. the calling program conditioning the global state information stored in the global state store to a calling program global state, performing predetermined calling program processing operations and calling the called program; and
   C. the called program saving the calling program global information contained in the global state store in the called program's virtual machine after being called by the calling program, the called program further conditioning the global state information in the global state store to a called program global state and performing predetermined called program processing operations, and thereafter restoring the saved calling program global state to the global state information store and returning control to the calling program.

2. A computer system as defined in claim 1 in which the calling program virtual machine is provided with a stack, the called program pushing the calling program global state on said stack when the calling program calls the called program, the called program popping the calling program global state off the stack when returning control to the calling program.

3. A computer system as defined in claim 1 in which the global machine further enables the virtual machines to operate contemporaneously in an interleaved manner in a series of time slots, the called program saving the called program global state contained in the global state store at the end of its time slot and restoring the saved called program global state to the global state store at the beginning of its next time slot.

4. A computer system as defined in claim 3 in which the each virtual machine is provided with a stack, the called program saving the called program global state on the stack at the end of its time slot, the called program popping the called program global state off the stack at the beginning of its next time slot.

5. A computer system as defined in claim 3 in which the called program while performing processing operations in one of said time slot will, in response to detection of a predetermined condition, relinquish remaining time in said one of said time slots, the called program saving the called program global state contained in the global state store upon relinquishment and restoring the saved called program global state to the global state store when the global machine again enables the called program.

6. A computer system as defined in claim 5 in which the virtual machine is provided with a stack, the called program saving the called program global state on said stack upon relinquishment, the called program virtual machine popping the calling program global state off the stack when it is again enabled.

7. A computer system including
   A. a computer
   B. a control subsystem for controlling the computer, the control subsystem comprising:
      i. a global machine control element for enabling the computer to provide a respective virtual machine for each of a calling program and a called program, the global machine control element further enabling the computer to provide a global state store for storing selected global state information for controlling selected operations;
      ii. a calling program control element enabling the computer to condition the global state information stored in the global state store to a calling program global state, perform predetermined calling program processing operations and call the called program; and
      iii. a called program control element enabling the computer to save the calling program global information contained in the global state store in the called program's virtual machine after being called in response to processing by the calling program, the calling program control element further enabling the computer to condition the global state information in the global state store to a called program global state, perform predetermined called program processing operations, and thereafter restore the saved calling program global state to the global state information store and return control to the calling program control element.

8. A computer system as defined in claim 7 in which the computer provides a stack associated with each virtual machine, the called program control element enabling the computer to push the calling program global state on said stack when the calling program calls the called program, the called program control element enabling the computer to pop the calling program global state off the stack when returning control to the calling program.

9. A computer system as defined in claim 7 in which the global machine further enables the computer to process the virtual machines contemporaneously in an interleaved manner in a series of time slots, the called program control element enabling the computer to save the called program global state contained in the global state store at the end of its time slot and to restore the saved called program global state to the global state store at the beginning of its next time slot.

10. A computer system as defined in claim 9 in which the computer provides a stack associated with the called program control element, the called program control element enabling the computer to save the called program global state on said stack at the end of its time slot, the called program popping the called program global state off the stack at the beginning of its next time slot.

11. A computer system as defined in claim 9 in which the called program enables the computer to, in response to detection of a predetermined condition, relinquish remaining time in said one of said time slots, the called program virtual machine control element enabling the computer to save the called program global state contained in the global state store upon relinquishment and restore the saved called program global state to the global state store when the global machine control element enables the computer to again process the called program control element.

12. A computer system as defined in claim 11 in which the computer is provided with a stack associated with the virtual machine, the called program control element enabling the computer to save the called program global state on said stack upon relinquishment, and pop the calling program global state off the stack when it is again processed.

13. A control subsystem for controlling a computer, the control subsystem comprising:
   A. a global machine control element for enabling the computer to provide a respective virtual machine for a each of a calling program and a called program, the global machine control element further enabling the computer to provide a global state store for storing selected global state information for controlling selected operations;
   B. a calling program control element enabling the computer to condition the global state information stored in the global state store to a calling program global state, perform predetermined calling program processing operations and call the called program; and
   C. a called program control element enabling the computer to save the calling program global information contained in the global state store in the called program's virtual machine after being called in response to processing by the calling program, the called program control element further enabling the computer to condition the global state information in the global state store to a called program global state, perform predetermined called program processing operations, and thereafter restore the saved calling program global state to the global state information store and return control to the calling program control element.

14. A control subsystem as defined in claim 13 in which the computer provides a stack associated with the virtual machine, the called program control element enabling the computer to push the calling program global state on said stack when the calling program calls the called program, the called program control element enabling the computer to pop the calling program global state off the stack when returning control to the calling program.

15. A control subsystem as defined in claim 13 in which the global machine further enables the computer to process the virtual machines contemporaneously in an interleaved manner in a series of time slots, the called program control element enabling the computer to save the called program global state contained in the global state store at the end of its time slot and to restore the saved called program global state to the global state store at the beginning of its next time slot.

16. A control subsystem as defined in claim 15 in which the computer provides a stack associated with the called program control element, the called program control element enabling the computer to save the called program global state on said stack at the end of its time slot, the called program popping the called program global state off the stack at the beginning of its next time slot.

17. A control subsystem as defined in claim 15 in which the called program enables the computer to, in response to detection of a predetermined condition, relinquish remaining time in said one of said time slots, the called program control element enabling the computer to save the called program global state contained in the global state store upon relinquishment and restore the saved called program global state to the global state store when the global machine control element enables the computer to again process the called program control element.

18. A control subsystem as defined in claim 17 in which the computer is provided with a stack associated with the virtual machine, the called program control element enabling the computer to save the called program global state on said stack upon relinquishment, and pop the calling program global state off the stack when it is again processed.

19. A computer program product comprising a computer system usable medium having computer system readable code embodied therein for causing a computer system to perform predetermined processing operations, the computer system program product including:
   A. global machine code devices configured to cause the computer system to provide a respective virtual machine for each of calling program code devices and called program code devices, the global machine code devices further enabling the computer to provide a global state store for storing selected global state information for controlling selected operations;
   B. calling program code devices configured to cause the computer system to condition the global state information stored in the global state store to a calling program global state, perform predetermined calling program processing operations and call the called program; and
   C. called program code devices configured to cause the computer system to save the calling program global information contained in the global state store in the virtual machine provided for the called program code devices after being called in response to processing by the calling program, the called program code devices further enabling the computer to condition the global state information in the global state store to a called program global state, perform predetermined called program processing operations, and thereafter restore the saved calling program global state to the global state information store and return control to the calling program code devices.

20. A computer program product as defined in claim 19 in which the called program code devices are further configured to cause a computer system to effect a stack associated with the virtual machine, the called program code devices further enabling the computer to push the calling program global state on said stack when the calling program calls the called program, and enabling the computer to pop the calling program global state off the stack when returning control to the calling program.

21. A computer program product as defined in claim 19 in which the global machine program code devices further enable the computer to process the virtual machines contemporaneously in an interleaved manner in a series of time slots, the called program code devices enabling the computer to save the called program global state contained in the global state store at the end of its time slot and to restore the saved called program global state to the global state store at the beginning of its next time slot.

22. A computer program product as defined in claim 21 in which the called program code devices are further configured to cause a computer system to effect a stack associated with the called program, the called program code devices further enabling the computer to push the calling program global state on said stack at the end of its time slot, and enabling the computer to pop the calling program global state off the stack at the beginning of its next time slot.

23. A computer program product as defined in claim 21 in which the called program code devices enable the computer to, in response to detection of a predetermined condition, relinquish remaining time in said one of said time slots, the called program code devices enabling the computer to save the called program global state contained in the global state store upon relinquishment and restore the saved called program global state to the global state store when the global machine program code devices enable the computer to again process the called program code devices.

24. A computer program as defined in claim 23 in which the called program code devices are further configured to cause a computer system to effect a stack associated with the virtual machine, the called program code devices further enabling the computer to push the calling program global state on said stack upon relinquishment, and enabling the computer to pop the calling program global state off the stack when it is again processed.

25. A method of controlling a computer system including the steps of:
   A. enabling the computer to provide a global machine which, in turn, provides a respective virtual machine for each o f a call program and a called program, the global machine further providing a global state store for storing selected global state information for controlling selected operations;
   B. enabling the computer to process the calling program, the calling program enabling the computer to condition the global state information stored in the global state store to a calling program global state, perform predetermined calling program processing operations and call the called program; and
   C. enabling the computer to process the called program, the called program enabling the computer to save the calling program global information contained in the global state store in the called program's virtual machine after being called in response to processing by the calling program, the calling program control element further enabling the computer to condition the global state information in the global state store to a called program global state, perform predetermined called program processing operations, and thereafter restore the saved calling program global state to the global state information store and return control to the calling program control element.

26. A method as defined in claim 25 further comprising the steps of enabling the computer to provide a stack associated with the called program control element, enabling the computer to push the calling program global state on said stack when the calling program calls the called program, and to pop the calling program global state off the stack when returning control to the calling program.

27. A method as defined in claim 25 further comprising the steps of enabling the computer to process the virtual-.machines contemporaneously in an interleaved manner in a series of time slots, enabling the computer to, when processing the called program, save the called program global state contained in the global state store at the end of the called program's time slot and to restore the saved called program global state to the global state store at the beginning of the called program's next time slot.

28. A method as defined in claim 27 further comprising the steps of enabling the computer to provide a stack associated with the called program, enabling the computer to save the called program global state on said stack at the end of the called program's time slot, and pop the called program global state off the stack at the beginning of the called program's next time slot.

29. A method as defined in claim 27 further comprising the steps of enabling the computer to, in response to detection of a predetermined condition during processing of the called program, relinquish remaining time in said one of said time slots, the computer being enabled to save the called program global state contained in the global state store upon relinquishment and restore the saved called program global state to the global state store when the computer is again enabled to process the called program.

30. A method as defined in claim 29 further comprising the steps of enabling the computer to provide a stack associated with the called program, the computer being enabled to save the called program global state on said stack upon relinquishment, and pop the calling program global state off the stack when the called program is again processed.

* * * * *